US009486811B2

(12) United States Patent
Weber et al.

(10) Patent No.: US 9,486,811 B2
(45) Date of Patent: Nov. 8, 2016

(54) APPARATUS FOR PREWASHING COMMINUTED PLASTIC PARTS (71) Applicant: Herbold Meckesheim GmbH, Meckesheim (DE)

(72) Inventors: Heiko Weber, Hamm (DE); Holger Watzelt, Neckargemuend (DE)

(73) Assignee: Herbold Meckesheim GmbH, Meckesheim (DE)

( * ) Notice: Subject to any disclaimer, the term of this patent is extended or adjusted under 35 U.S.C. 154(b) by 0 days.

(21) Appl. No.: 14/398,894

(22) PCT Filed: Oct. 10, 2012

(86) PCT No.: PCT/DE2012/200067
§ 371 (c)(1),
(2) Date: Nov. 4, 2014

(87) PCT Pub. No.: WO2013/182174
PCT Pub. Date: Dec. 12, 2013

(65) Prior Publication Data
US 2015/0114887 A1    Apr. 30, 2015

(30) Foreign Application Priority Data
Jun. 6, 2012   (DE) .................. 10 2012 209 574

(51) Int. Cl.
*B03B 5/40*       (2006.01)
*B03B 5/28*       (2006.01)
(Continued)

(52) U.S. Cl.
CPC . *B03B 5/28* (2013.01); *B03B 5/00* (2013.01); *B03B 5/40* (2013.01); *B03B 11/00* (2013.01); *B08B 3/042* (2013.01); *B08B 3/10* (2013.01); *B03B 2011/008* (2013.01)

(58) Field of Classification Search
CPC ............. B03B 5/00; B03B 5/28; B03B 5/36; B03B 5/40; B03B 2011/008
See application file for complete search history.

(56) References Cited

U.S. PATENT DOCUMENTS 1,792,179 A * 2/1931 McLean ............... B03B 5/66
                                                                 209/156
2,365,734 A * 12/1944 Tromp ................ B03B 5/40
                                                                 209/156
(Continued)

FOREIGN PATENT DOCUMENTS

DE          2804729 A1    8/1979

OTHER PUBLICATIONS

International Searching Authority, International Search Report (ISR) and Written Opinion for Application No. PCT/DE2012/200067, Apr. 17, 2013, 9 pages, European Patent Office, The Netherlands.

(Continued)

*Primary Examiner* — Joseph C Rodriguez
(74) *Attorney, Agent, or Firm* — Alston & Bird LLP (57) ABSTRACT An apparatus for prewashing comminuted plastic parts and for separating heavy materials or mineral constituents such as sand, silt, etc., comprises a material feed (1) for the plastic parts to be prewashed, a separating region (2) for the heavy materials, which comprises a separating chamber (3) that is filled with water during operation, a washing region (4) for the further washing of the floating fraction coming from the separating region (2), which comprises a washing chamber (6) working with a water bath (5) and/or shower/spray water, and a drawing-off region (7) for the usable material washed in the washing region (4), which comprises a drawing-off chamber (8) that is filled with water during operation, wherein the plastic parts pass via the material feed (1) into the separating chamber (8), preferably by gravitational force, via a first conveying device (9), as a floating fraction, into the washing chamber (6) and, as usable material, into the drawing-off chamber (8), and from there are conveyed via a second conveying device (10) to a material discharge (11).

18 Claims, 5 Drawing Sheets (51) Int. Cl.
*B03B 5/00* (2006.01)
*B08B 3/04* (2006.01)
*B08B 3/10* (2006.01)
*B03B 11/00* (2006.01)

(56) References Cited

U.S. PATENT DOCUMENTS

| | | | | |
|---|---|---|---|---|
| 4,169,787 A | * | 10/1979 | Gunnerson | B03B 5/66 209/173 |
| 4,375,264 A | * | 3/1983 | Porter | A22C 29/043 209/173 |
| 4,585,547 A | * | 4/1986 | Nicholson | B03B 5/60 209/156 |
| 4,750,995 A | * | 6/1988 | Fogerson | A23L 1/2163 209/17 |
| 4,813,618 A | * | 3/1989 | Cullom | B03B 9/065 209/173 |
| 4,858,769 A | * | 8/1989 | DeVries | A23N 12/02 134/131 |
| 4,946,584 A | * | 8/1990 | Olney | A23N 15/00 209/156 |
| 5,039,534 A | * | 8/1991 | Adams | B03B 5/62 209/156 |
| 5,185,041 A | | 2/1993 | Anderson et al. | |
| 5,547,569 A | * | 8/1996 | Spencer | B01D 21/0012 210/206 |
| 6,506,310 B2 | * | 1/2003 | Kulbeth | B01D 21/0018 175/206 |
| RE38,367 E | * | 12/2003 | Southall | B03B 9/00 175/206 |
| 7,017,753 B2 | * | 3/2006 | Tse | B03B 5/40 209/156 |
| 7,255,233 B2 | * | 8/2007 | Daniels | B01D 21/0012 209/12.1 |
| 7,954,642 B2 | * | 6/2011 | Jody | B03B 5/623 209/158 |
| 8,151,993 B2 | * | 4/2012 | Smith | B03B 5/40 209/162 |
| 2008/0135461 A1 | * | 6/2008 | Olivier | B03B 5/28 209/162 |
| 2015/0251191 A1 | * | 9/2015 | Flores | B03B 5/28 209/3 |

OTHER PUBLICATIONS

The International Bureau of WIPO, International Preliminary Report on Patentability forwarding the English translation of the International Searching Authority's Written Opinion for International Application No. PCT/DE2012/200067, Dec. 9, 2014, 4 pages, Switzerland.

* cited by examiner

APPARATUS FOR PREWASHING COMMINUTED PLASTIC PARTS

CROSS REFERENCE TO RELATED APPLICATIONS

This application is a national stage application, filed under 35 U.S.C. §371, of International Application No. PCT/DE2012/200067, filed Oct. 10, 2012, which claims priority to German Application No. 10 2012 209 574.8, filed Jun. 6, 2012, the contents of both of which as are hereby incorporated by reference in their entirety.

BACKGROUND

1. Technical Field

The invention relates to a device for prewashing comminuted plastic parts, and for separating heavy fractions and/or mineral constituents such as sand, silt, etc. from the comminuted plastic parts.

2. Description of Related Art

The object is fundamentally a prewashing unit which has the fundamental function of a heavy fraction separator as protection for downstream machine components such as blade granulators, friction washers, mechanical driers, etc. In addition, the prewashing unit serves the purpose of prewashing comminuted plastic parts, wherein mineral constituents such as sand or silt are substantially washed away from the plastic parts. This is a combined device with the function of a heavy fraction separator and a prewasher.

In actual practice, devices are known in the class which either work as heavy fraction separators or fulfill the task of a prewasher. Both tasks are commonly solved in the same device only to an insufficient degree. In addition, the devices known from actual practice have a complex construction and are therefore expensive.

BRIEF SUMMARY

The present invention therefore addresses the problem of providing a device for prewashing comminuted plastic parts and for separating heavy fractions therefrom, which fulfills both tasks in combination, has a simple construction, and not least of all functions without failure.

The problem as stated above is addressed by the features of claim 1. According to claim 1, the device according to the invention has a material feed for the plastic parts to be prewashed, a separation segment for the heavy fractions, the same having a separation chamber which is filled with water during operation, a washing segment for further washing the floating fraction coming out of the separation segment, the same having a washing chamber which works with a water bath and/or shower/spray water, and an outfeed segment for the product washed in the washing segment, having an outfeed chamber which is filled with water during operation. The comminuted plastic parts are preferably moved into the separation chamber by gravity, via the material feed, and arrive in the washing chamber via a first conveyor device, as the floating fraction. The plastic parts, as the product, are transported into the outfeed chamber, and from there move to a material outfeed via a second conveyor device. From there, it can be contemplated that the prewashed plastic parts fall into a container or onto a conveyor belt for conveyance into a further processing station.

The device according to the invention is equipped with the separation segment for heavy fractions, mentioned earlier, for the purpose of separating heavy fractions, having a separation chamber which is filled with water. Heavy fractions which can lead to damage to downstream processing assemblies if persistently adhering to the plastic parts separate from the plastic parts and sink in the water of the separation chamber downward, arriving into the functional region of a heavy fraction outfeed. Such a heavy fraction outfeed can be constructed in the form of a screw arranged in the lower region of the separation chamber, such that the sedimented heavy fraction can be evacuated. As an alternative to the screw, a container and/or a receptacle, with a drainage device, can be installed in the heavy fraction outfeed. The sedimented heavy fraction can also be removed by this measure.

To minimize the risk of product (comminuted plastic parts) sinking, the separation chamber can be equipped with a stirring unit which projects downward into the separation chamber, and/or with an air injection nozzle and/or a water injection nozzle, such that the product always returns to the surface for further transport.

The first conveyor device advantageously extends from the separation chamber into the washing segment and/or into the washing chamber, wherein the washing segment connects to the separation segment. In a very particularly advantageous manner, the first conveyor device extends to, or into, the outfeed segment and/or into the outfeed chamber, such that the first conveyor device separation chamber completely transports the floating fraction through the washing segment and therefore also through the washing chamber.

Any arbitrary conveyor devices can be implemented, as long as they are suitable for conveying the floating fraction which floats on the top in a substantially horizontal direction. In a very particularly advantageous manner, the first conveyor device can have at least one, and preferably two screw conveyors, wherein the two screw conveyors are arranged parallel to each other and preferably run horizontally. The floating fraction—that is, the comminuted plastic parts—is/are transported in and through the washing segment by the two screw conveyors.

A screw hutch, designed as a sieve segment, can be included in the washing segment, serving the purpose of discharging wash water. The wash water is furnished in a particularly advantageous manner via wash nozzles, which serve the purpose of spraying and/or washing the floating fraction transported to that point. The actual prewashing therefore takes place in the washing segment and/or in the washing chamber.

A collecting chamber is arranged below the washing segment, preferably below the sieve segment, for the purpose of collecting the discharged wash water. The collecting chamber is sized in such a manner that it can capture a sufficiently large volume of wash water over a certain period of time, said volume continuously accumulating via the wash nozzles.

With respect to a reduction in the consumption of water, it is advantageous if the collecting chamber is designed as a sediment separator, wherein the clear stream of the collecting chamber has a fluid connection to a pump chamber. As such, the clear stream is transported from the washing chamber into the pump chamber, and from there is transported to the wash nozzles via a pump, such that the wash water circulates.

A suction device for the sediment is included, in a further advantageous manner, in the brine region of the collecting chamber, and/or a corresponding suction device functions in the brine region, wherein the same can work discontinuously. The sediment consisting of sand or silt is therefore preferably discontinuously drawn out of the collecting chamber.

From the washing segment and/or from the washing chamber, the product is continuously further conveyed via the first conveyor device, particularly into the outfeed chamber. This is—like the separation chamber—filled with water. A second conveyor device is included at this point, which—like the first conveyor device—can have a screw conveyor. If such a screw conveyor is included, it is advantageous to position the same between the two screw conveyors of the first conveyor device which end at this point, and particularly at an angle which conveys the product out of the plane of the various segments/chambers, at a regular angle tilted upward or tilted upward and to the side.

The screw conveyor extends to a material outfeed which can be designed in the form of a chute.

Air injection nozzles and/or water injection nozzles can be included in the outfeed chamber for the purpose of supporting the transport of material from the outfeed chamber to the material outfeed, such that the product stirred up as a result moves easily into the functional region of the second conveyor device and/or the screw conveyor.

Sediment forms in the base region of the outfeed chamber. Accordingly, a suction device can be included and/or can function in this region. Such a suction device can likewise work discontinuously to suction off the sediment—for example via a material discharge lock.

According to the embodiments above, the device according to the invention is characterized by the combination of a heavy fraction separator with an effective material washing, wherein the material washing can take place in a flowing stream of water. A processing of the water, with a circulation thereof, is included and/or integrated for the purpose of minimizing the consumption of water, thereby offering a not insignificant contribution to protecting the environment.

BRIEF DESCRIPTION OF THE FIGURES

At this point, there are various options for embodying and implementing the teaching of the present invention in an advantageous manner. For this purpose, reference is hereby made on the one hand to the claims dependent on claim 1, and on the other hand to the following explanation of a preferred embodiment of the invention and the drawings. Generally preferred embodiments and developments of the teaching are also explained in connection with the explanation of the preferred embodiment by means of the drawing. In the drawing:

DETAILED DESCRIPTION OF VARIOUS EMBODIMENTS

Figure 1:
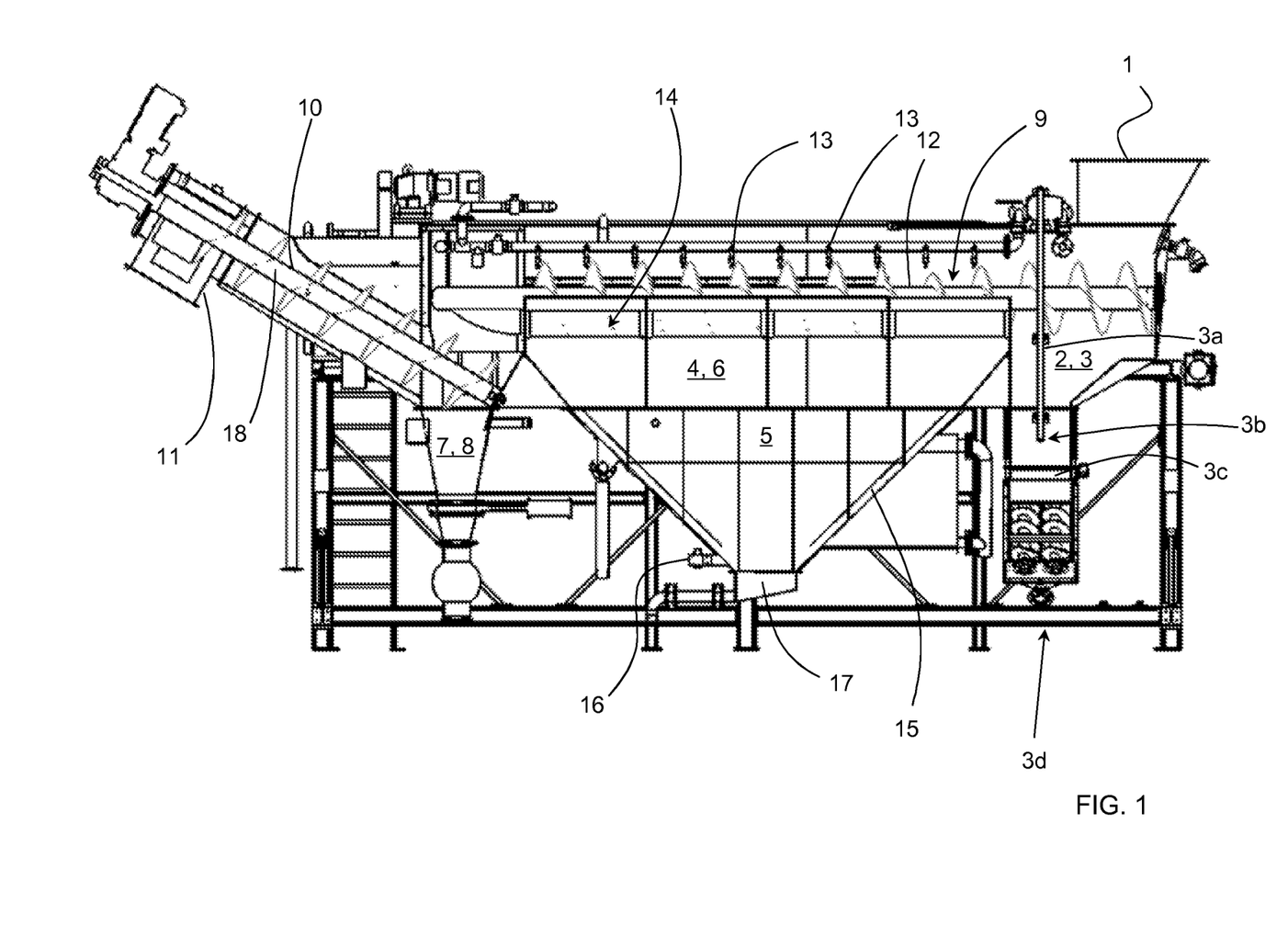
FIG. 1 shows a schematic side view, partially cutaway, of one embodiment of a device according to the invention, having the essential segments and/or chambers/functional elements.
Figure 2:
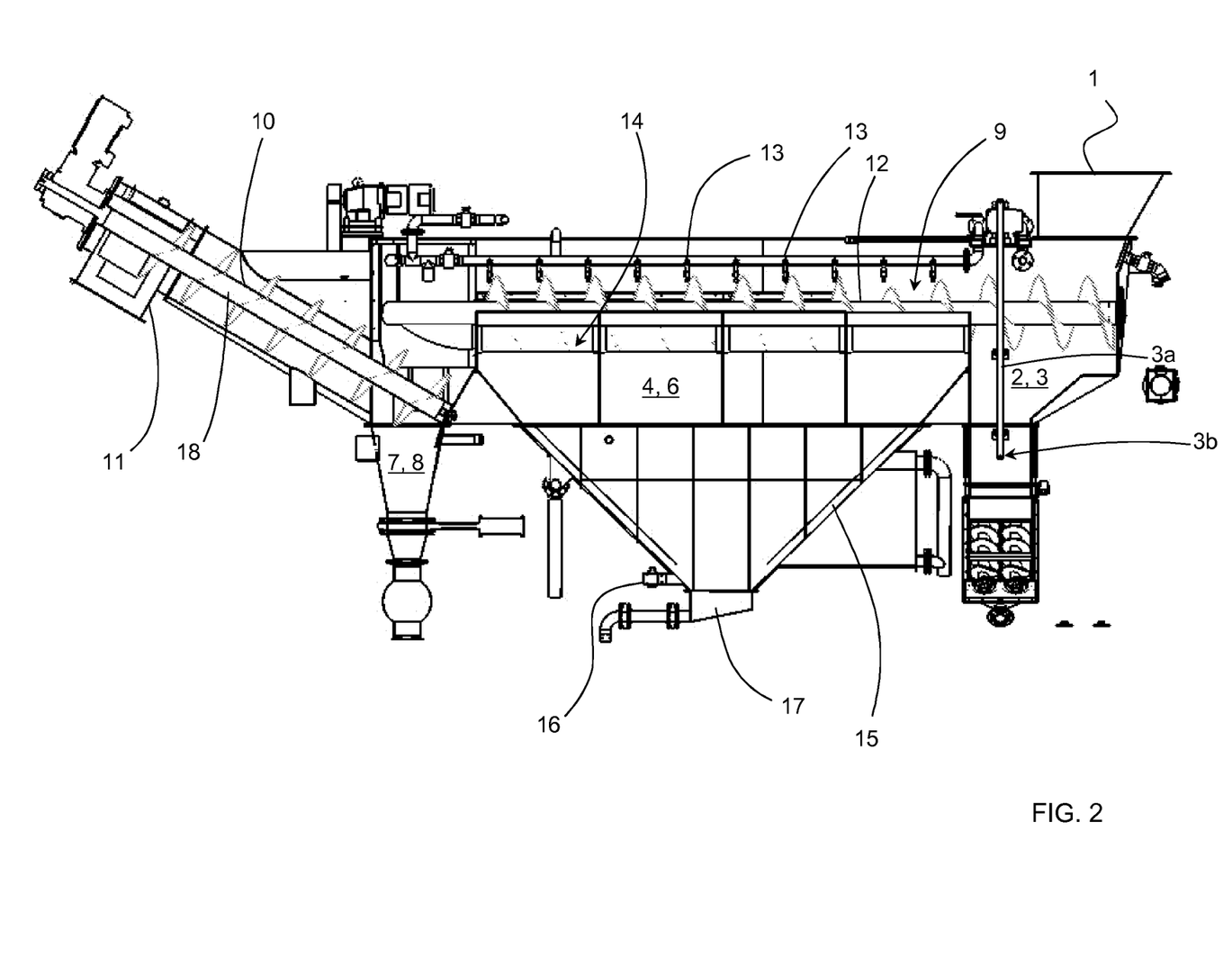
FIG. 2 shows a schematic side view, partially cutaway, of the object in FIG. 1, however without the machine frame.
Figure 3:
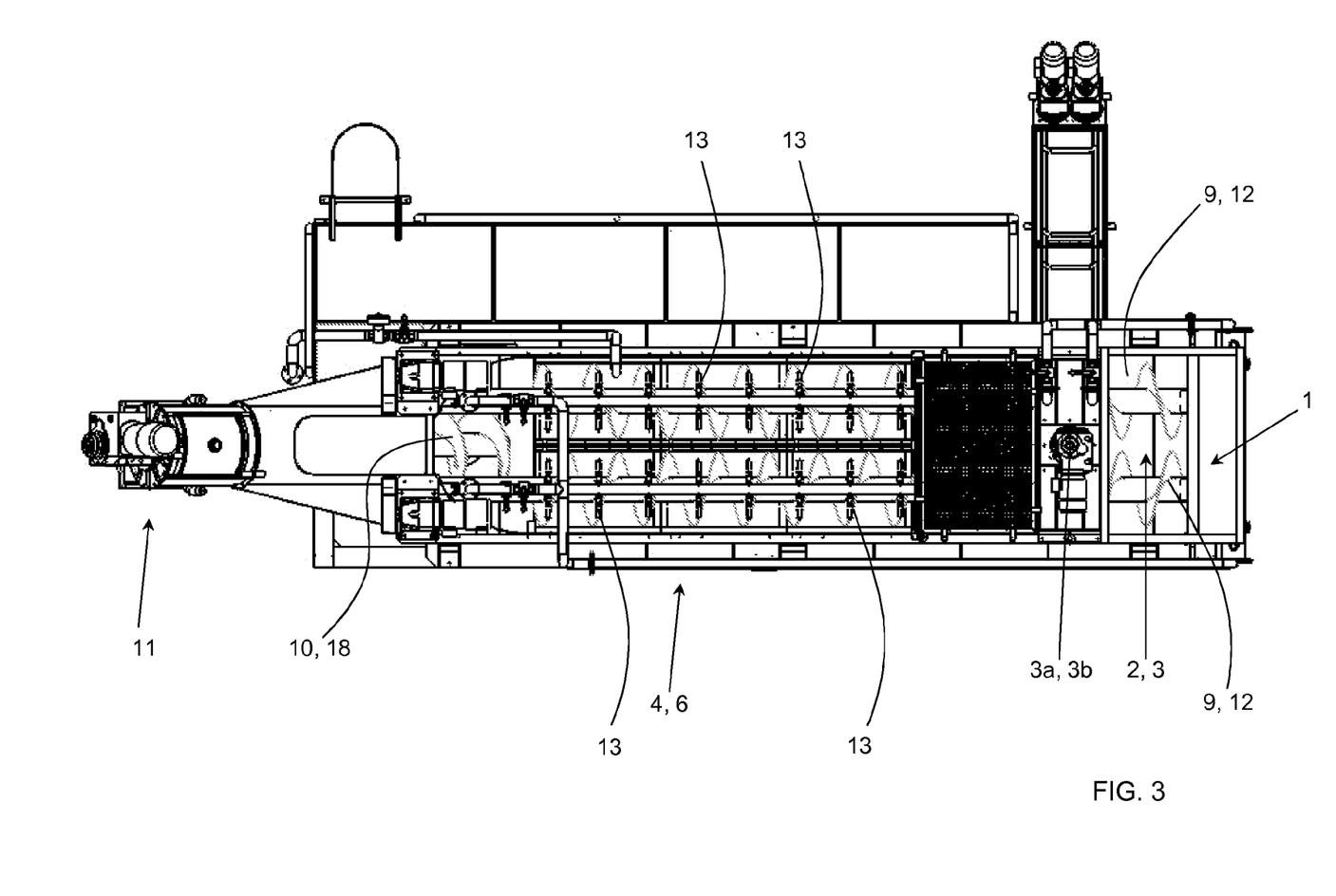
FIG. 3 shows a schematic top view of the object in FIG. 1.
Figure 4:
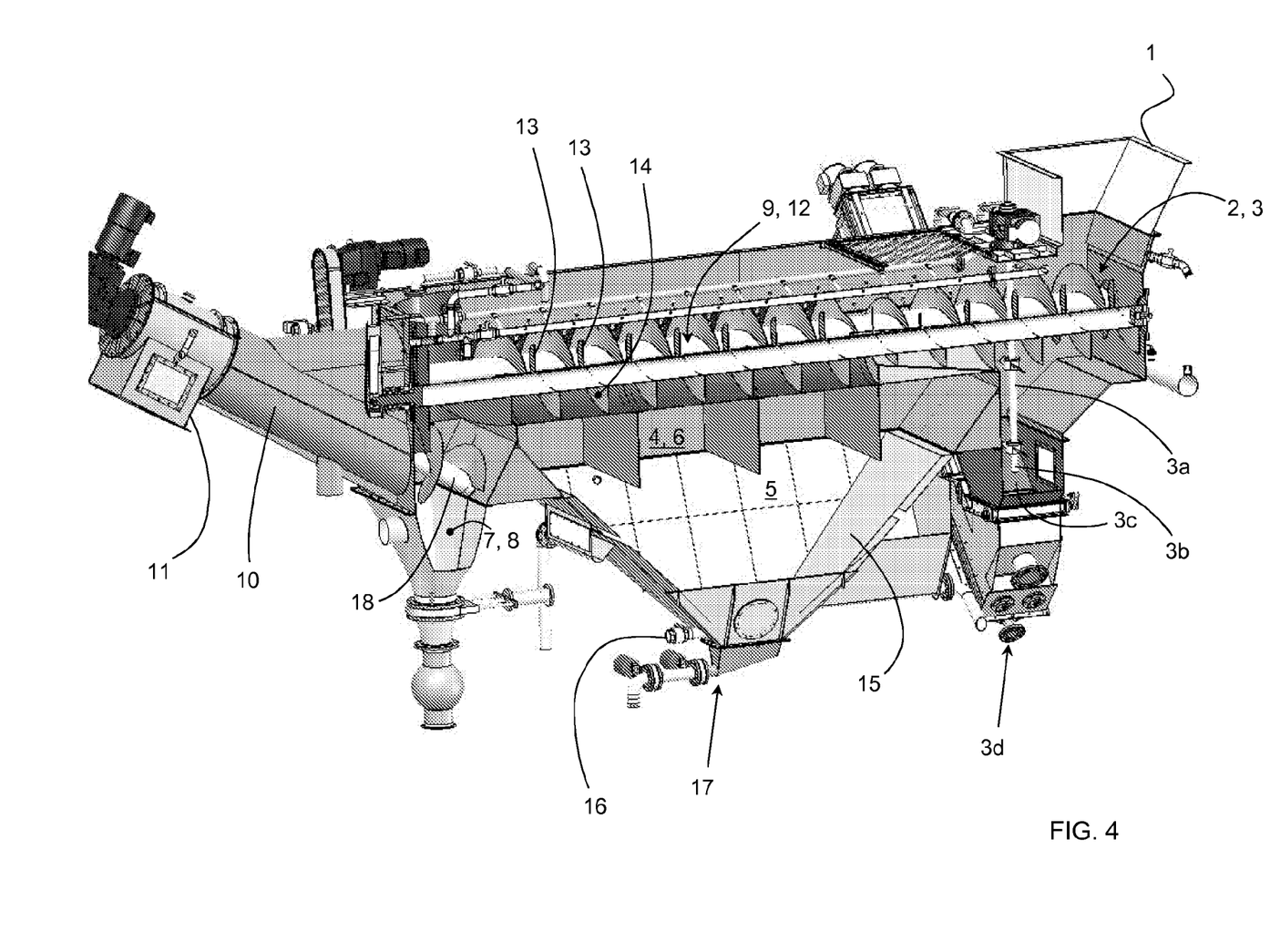
FIG. 4 shows a perspective view of the object in FIG. 1, cutaway in the region of the front screw conveyor.
Figure 5:
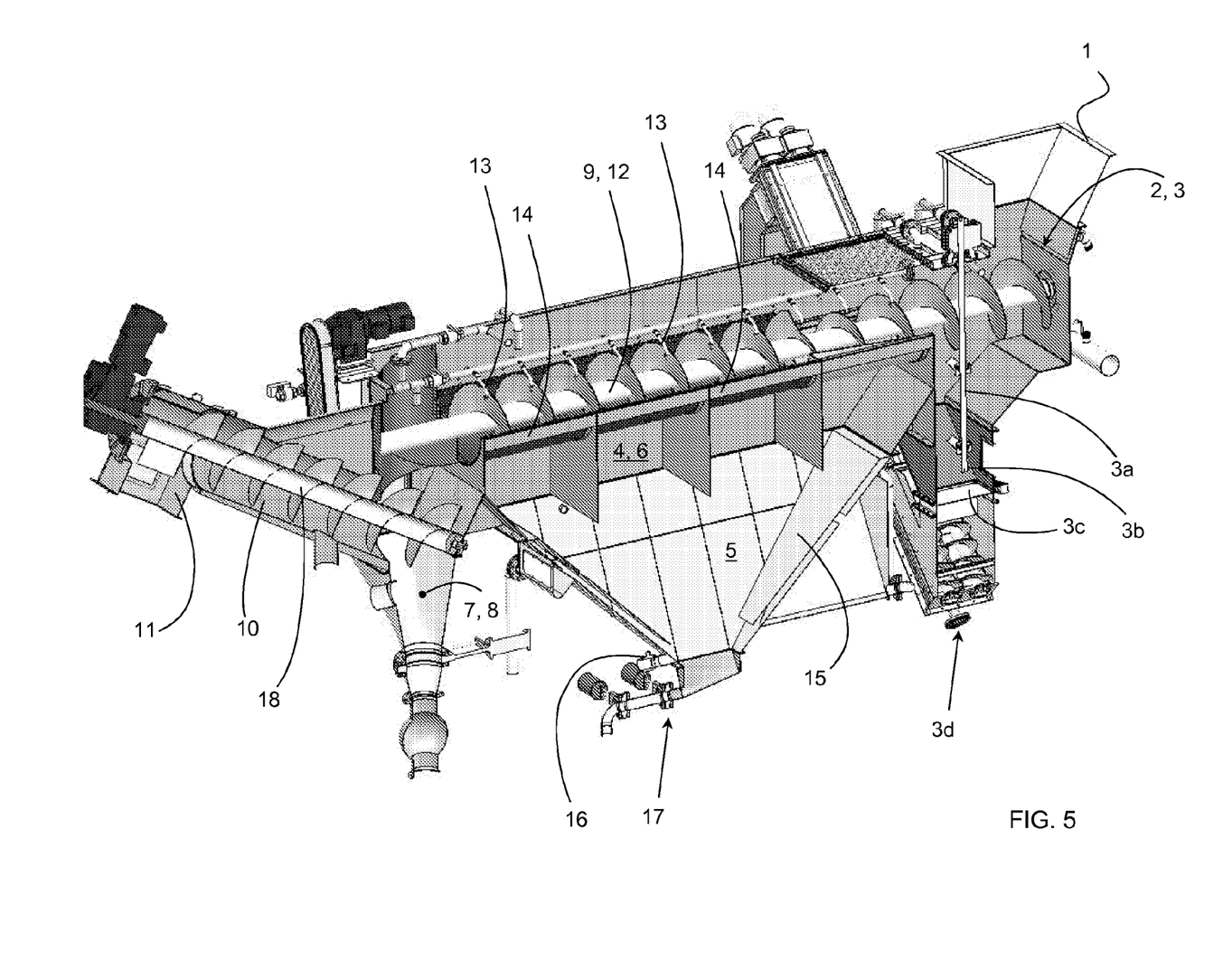
FIG. 5 shows a perspective view of the object in FIG. 4, cutaway in front of the rear screw conveyor.

FIGS. 1 to 5 show schematic views of one embodiment of a device according to the invention for prewashing comminuted plastic parts, and for separating heavy fractions and/or mineral constituents such as sand, silt, etc. from the plastic parts.

The plastic parts are fed to the device via a material feed 1. From there, the parts move into a separation segment 2 for the heavy materials, the same having a separation chamber 3 which is filled with water during operation.

A stirring unit 3a and an air injection nozzle 3b and/or a water injection nozzle are included in the separation chamber 3 to work against the sinking of product.

Together, the figures show that a flap gate 3c is included below the separation chamber 3, directly below the stirring unit 3a, holding back the material sinking in the separation segment 2 and/or in the separation chamber 3 before it moves into the heavy fraction outfeed 3d positioned below. This precautionary measure is particularly advantageous for preventing an unintentional ejection of floating fractions through the heavy fraction outfeed 3d. In the event that a sediment layer consisting of sand, dirt, etc. forms on the flap gate 3c, a time control can be included, in an additionally advantageous manner, which opens the flap gate briefly so that the sediment moves into the heavy fraction outfeed 3d. Next, the flap gate 3c is again closed—automatically or manually. The flap gate 3c makes it possible to sluice plastics through the device which typically sink in water, and—without the precautionary measure of the flap gate, particularly in conventional heavy fraction separators—are lost from the recycling.

In addition, a washing segment 4 is part of the device, for the purpose of further washing the floating fraction coming from the separation segment 2. The washing segment 4 has a washing chamber 6 which works with shower/spray water. If a water bath is included as a measure, it is likewise situated in the washing chamber 6.

An outfeed segment 7 for the product washed in the washing segment 4 is connected to the washing segment 4. The outfeed segment 7 has an outfeed chamber 8 which is filled with water during operation.

The comminuted plastic parts move into the outfeed chamber 3 by the force of gravity, via the material feed 1. From there, a first conveyor device 9 extends through the washing segment 4 such that the floating fraction is transported from the separation segment 2 into the washing segment 4 and from there as product into the outfeed chamber 8. A second conveyor device 10 is included in the outfeed segment 7 and/or in the outfeed chamber 8, which transports the prewashed production to a material outfeed 11.

The figures make it possible to see that the first conveyor device 9 has a screw conveyor 12, and more precisely two screw conveyors 12 which run parallel to each other. The two screw conveyors 12 convey the parts in an ideal manner from the separation segment 2 through the washing segment 4 and into the outfeed segment 7 and/or the outfeed chamber 8.

In addition, it is indicated in the figures that wash nozzles 13 are constructed in the washing segment 4 for the purpose of spraying and/or washing the floating fraction transported to that point. The wash water, with the dirt separated from the parts, falls onto a screw hutch 14 constructed as a sieve segment, which serves the purpose of discharging the wash water.

A collecting chamber 15 is included below the washing segment 4, and preferably below the sieve segment and/or the screw hutch 14, for the purpose of collecting the discharged wash water, wherein the collecting chamber 15 is designed as a sediment separator. The clear stream 16 of the collecting chamber 15 has a fluid connection to a pump chamber, at which point the clear stream 16 is transported as wash water to the wash nozzles 13. A discharge lock 17 is included for the sediment in the brine region of the collecting chamber 15. As an alternative, a suction device could be included for the sediment, wherein such a suction device can preferably work discontinuously.

It is also indicated in the figures that the screw conveyors 12 of the first conveyor device 9 extend into the outfeed chamber 8. The second conveyor device 10 begins at this point, with screw conveyors 18 which begin in the region between the two screw conveyors 12 of the first conveyor device 9, and transport the product from there into a region below the device, particularly up to the material outfeed 11, such that the product can fall out of the device at this point—by way of example onto a conveyor belt, the same not shown in the figure, or into a container.

It should thus be appreciated that the device according to the invention is equipped with the separation segment for heavy fractions, mentioned earlier, for the purpose of separating heavy fractions, having a separation chamber which is filled with water. Heavy fractions which can lead to damage to downstream processing assemblies if persistently adhering to the plastic parts separate from the plastic parts and sink in the water of the separation chamber downward, arriving into the functional region of a heavy fraction outfeed. Such a heavy fraction outfeed can be constructed in the form of a screw arranged in the lower region of the separation chamber, such that the sedimented heavy fraction can be evacuated. As an alternative to the screw, a container and/or a receptacle, with a drainage device, can be installed in the heavy fraction outfeed. The sedimented heavy fraction can also be removed by this measure.

To minimize the risk of product (comminuted plastic parts) sinking, the separation chamber can be equipped with a stirring unit which projects downward into the separation chamber, and/or with an air injection nozzle and/or a water injection nozzle, such that the product always returns to the surface for further transport.

The first conveyor device advantageously extends from the separation chamber into the washing segment and/or into the washing chamber, wherein the washing segment connects to the separation segment. In a very particularly advantageous manner, the first conveyor device extends to, or into, the outfeed segment and/or into the outfeed chamber, such that the first conveyor device separation chamber completely transports the floating fraction through the washing segment and therefore also through the washing chamber.

Any arbitrary conveyor devices can be implemented, as long as they are suitable for conveying the floating fraction which floats on the top in a substantially horizontal direction. In a very particularly advantageous manner, the first conveyor device can have at least one, and preferably two screw conveyors, wherein the two screw conveyors are arranged parallel to each other and preferably run horizontally. The floating fraction—that is, the comminuted plastic parts—is/are transported in and through the washing segment by the two screw conveyors.

A screw hutch, designed as a sieve segment, can be included in the washing segment, serving the purpose of discharging wash water. The wash water is furnished in a particularly advantageous manner via wash nozzles, which serve the purpose of spraying and/or washing the floating fraction transported to that point. The actual prewashing therefore takes place in the washing segment and/or in the washing chamber.

A collecting chamber is arranged below the washing segment, preferably below the sieve segment, for the purpose of collecting the discharged wash water. The collecting chamber is sized in such a manner that it can capture a sufficiently large volume of wash water over a certain period of time, said volume continuously accumulating via the wash nozzles.

With respect to a reduction in the consumption of water, it is advantageous if the collecting chamber is designed as a sediment separator, wherein the clear stream of the collecting chamber has a fluid connection to a pump chamber. As such, the clear stream is transported from the washing chamber into the pump chamber, and from there is transported to the wash nozzles via a pump, such that the wash water circulates.

A suction device for the sediment is included, in a further advantageous manner, in the brine region of the collecting chamber, and/or a corresponding suction device functions in the brine region, wherein the same can work discontinuously. The sediment consisting of sand or silt is therefore preferably discontinuously drawn out of the collecting chamber.

From the washing segment and/or from the washing chamber, the product is continuously further conveyed via the first conveyor device, particularly into the outfeed chamber. This is—like the separation chamber—filled with water. A second conveyor device is included at this point, which—like the first conveyor device—can have a screw conveyor. If such a screw conveyor is included, it is advantageous to position the same between the two screw conveyors of the first conveyor device which end at this point, and particularly at an angle which conveys the product out of the plane of the various segments/chambers, at a regular angle tilted upward or tilted upward and to the side.

The screw conveyor extends to a material outfeed which can be designed in the form of a chute.

Air injection nozzles and/or water injection nozzles can be included in the outfeed chamber for the purpose of supporting the transport of material from the outfeed chamber to the material outfeed, such that the product stirred up as a result moves easily into the functional region of the second conveyor device and/or the screw conveyor.

Sediment forms in the base region of the outfeed chamber. Accordingly, a suction device can be included and/or can function in this region. Such a suction device can likewise work discontinuously to suction off the sediment—for example via a material discharge lock.

According to the embodiments above, the device according to the invention is characterized by the combination of a heavy fraction separator with an effective material washing, wherein the material washing can take place in a flowing stream of water. A processing of the water, with a circulation thereof, is included and/or integrated for the purpose of minimizing the consumption of water, thereby offering a not insignificant contribution to protecting the environment.

Finally, explicit reference is made to the fact that the exemplary embodiments of the device according to the invention described above are used only for explanation of the claimed teaching, but the teaching is not restricted to the exemplary embodiments.

REFERENCE LIST

1 material feed
2 separation segment
3 separation chamber 3a stirring unit
3b air injection nozzle
3c flap gate
3d heavy fraction discharge
4 washing segment
5 water bath
6 washing chamber
7 outfeed segment
8 outfeed chamber
9 first conveyor device
10 second conveyor device
11 material outfeed
12 screw conveyor (of 9)
13 wash nozzle
14 screw hutch
15 collecting chamber
16 clear stream
17 discharge lock
18 screw conveyor (of 10)

The invention claimed is:

1. A device for prewashing comminuted plastic parts, and for separating heavy fractions and/or mineral constituents, said device comprising:
   a material feed for the plastic parts to be prewashed,
   a separation segment for the heavy fractions, the separation segment comprising a separation chamber which is filled with water during operation,
   a washing segment for further washing floating fraction coming out of the separation segment, the washing segment comprising a washing chamber which works with at least one of a water bath or shower water or spray water, and
   an outfeed segment for product washed in the washing segment, the outfeed segment comprising an outfeed chamber which is filled with water during operation, wherein:
      the plastic parts are moved into the separation chamber by gravity, via the material feed, and arrive in the washing chamber via a first conveyor device, as the floating fraction, and as the product are transported into the outfeed chamber, and from there move to a material outfeed via a second conveyor device;
      the first conveyor device has at least one screw conveyor;
      the separation chamber has at least one of a stirring unit, an air injection nozzle, or a water injection nozzle; and
      the at least one of the stirring unit, the air injection nozzle, or the water injection nozzle are projecting downward into the chamber.

2. The device according to claim 1, wherein the separation chamber has a heavy fraction outfeed.

3. The device according to claim 2, wherein the heavy fraction outfeed is in the form of a screw arranged in the lower region.

4. The device according to claim 1, wherein the separation chamber has a container with a drainage device.

5. The device according to claim 1, wherein the first conveyor device extends from the separation chamber into at least one of the washing segment or the washing chamber.

6. The device according to claim 1, wherein the first conveyor device extends at least one of up to or into at least one of the outfeed segment or the outfeed chamber.

7. The device according to claim 1, wherein the first conveyor device has two screw conveyors.

8. The device according to claim 7, characterized in that the two screw conveyors are arranged parallel to each other and run horizontally.

9. The device according to claim 1, wherein a screw hutch, designed as a sieve segment, is included in the washing segment serving the purpose of discharging wash water.

10. The device according to claim 1, wherein a screw hutch, designed as a sieve segment, is included in the washing chamber, serving the purpose of discharging wash water.

11. The device according to claim 1, wherein wash nozzles are constructed in the washing segment for the purpose of at least one of spraying or washing the floating fraction transported to that point.

12. The device according to claim 11, wherein a collecting chamber is arranged below the washing segment for the purpose of collecting the discharged wash water.

13. The device according to claim 11, wherein a collecting chamber is arranged below a sieve segment, for the purpose of collecting the discharged wash water.

14. The device according to claim 12, wherein:
   the collecting chamber is designed as a sediment separator,
   a clear stream of the collecting chamber has a fluid connection to a pump chamber, and
   the clear stream is transported from there to the wash nozzles as wash water.

15. The device according to claim 12, wherein a suction device for the sediment works in a brine region of the collecting chamber, and the suction device works discontinuously.

16. The device according to claim 1, wherein the second conveyor device included in the outfeed chamber has a screw conveyor and the at least one screw conveyor of the first conveyor device comprises two screw conveyors, wherein the screw conveyor of the second conveyor device runs between the two screw conveyors which end there, of the first conveyor device, and extends to the material outfeed.

17. The device according to claim 1, wherein at least one of air injection nozzles or water injection nozzles are included for the purpose of supporting the transport of material in the outfeed chamber.

18. The device according to claim 1, wherein:
   at least one of a discharge lock or a suction device for the sediment works in the base segment of the outfeed chamber, and
   at least one of the discharge lock or the suction device works discontinuously and suctions off sediment via a material discharge lock.

* * * * *